(12) United States Patent
Cole

(10) Patent No.: US 7,170,401 B1
(45) Date of Patent: Jan. 30, 2007

(54) SYSTEM TO DETECT THE PRESENCE OF AN UNATTENDED CHILD IN A VEHICLE

(76) Inventor: Charles J. Cole, 1095 Rolling Park La., Fort Mill, SC (US) 29715

( * ) Notice: Subject to any disclaimer, the term of this patent is extended or adjusted under 35 U.S.C. 154(b) by 35 days.

(21) Appl. No.: 10/889,144

(22) Filed: Jul. 13, 2004

(51) Int. Cl.
*B60Q 1/00* (2006.01)

(52) U.S. Cl. .................... 340/457; 340/439; 340/573.1

(58) Field of Classification Search ................ 340/457, 340/438, 439, 457.1, 425.5, 430, 426.12, 340/426.24, 426.28, 573.1, 667; 701/44, 701/45, 1
See application file for complete search history.

(56) References Cited

U.S. PATENT DOCUMENTS

| | | | | |
|---|---|---|---|---|
| 5,793,291 | A * | 8/1998 | Thornton | 340/573.1 |
| 6,489,889 | B1 * | 12/2002 | Smith | 340/457 |
| 6,768,420 | B2 * | 7/2004 | McCarthy et al. | 340/573.1 |
| 6,792,339 | B2 * | 9/2004 | Basson et al. | 701/1 |
| 6,922,147 | B1 * | 7/2005 | Viksnins et al. | 340/573.1 |
| 6,924,742 | B2 * | 8/2005 | Mesina | 340/573.1 |
| 2002/0161501 | A1 * | 10/2002 | Dulin et al. | 701/45 |
| 2003/0222775 | A1 * | 12/2003 | Rackham et al. | 340/457 |

* cited by examiner

*Primary Examiner*—Brent A. Swarthout
(74) *Attorney, Agent, or Firm*—Peter Loffler

(57) ABSTRACT

A system detects the presence of an unattended child within a vehicle and when the child is so detected, disables the vehicle's door locks by preventing doors from being locked or remaining locked and sounds an alarm. The presence of a child is detected by measuring pressure on the back seat and measurements above a threshold limit signify a child is present or if any of the rear seat belts are buckled a child is detected. The system can be shut off by the driver, although the system has an override in the shutoff mode so that if the temperature rises above or falls below a certain level and the presence of a child is detected, the alarm is sounded. In this mode, the presence of the child can also be detected by a motion sensor.

13 Claims, 4 Drawing Sheets

SYSTEM TO DETECT THE PRESENCE OF AN UNATTENDED CHILD IN A VEHICLE

BACKGROUND OF THE INVENTION

1. Field of the Invention

The present invention relates to a system that detects the presence of an unattended child in a vehicle in order to sound an alarm and unlock the vehicle's doors if the presence of a child is detected.

2. Background of the Prior Art

While most parents cannot fathom the possibility, sadly many children are left unattended in a vehicle each year, sometimes with tragic results. Some parents and caregivers, not wanting to go through the trouble of unbuckling and rebuckling a child, will often leave the child or children in a vehicle while the person runs a quick errand such as running into the supermarket. Sometimes the child is left for longer periods of time as the parent or caregiver goes to work with the child in tow, or worse, goes to a nightclub or other adult oriented venue. Still other times the child is simply forgotten about as the parent or caregiver is running about town, especially if the caregiver is not the parent and is not accustomed to having children in the back seat on a regular basis.

Fortunately, most incidents of child neglect within a vehicle have benign results. Even when no adverse occurrences are occasioned on the unattended child, the child is left unprotected and potentially at the mercy of passersby. However, sometimes the child suffers serious injuries or death as a result of being in a vehicle for a prolonged amount of time. In summertime weather, the temperatures inside a closed vehicle can reach 140 degrees or more, far too high for any person, especially a child to survive in for prolonged periods of time.

Although most people will report an unattended child in a vehicle to police, many people do not pay attention to the insides of other peoples' vehicles in a parking lot and simply do not see an unattended child. Window tinting and vehicles high off the ground oftentimes make detecting the presence of a child difficult, especially when the child is within a car seat and gives out no substantial silhouette against the vehicle's windows.

Accordingly, there exists a need in the art that will alert passersby to the presence of an unattended child within a vehicle so that the appropriate authorities can be summoned by the passersby. Such a system should give any intervenors that rescue the unattended child quick and easy access to the interior of the vehicle and thus the unattended child. Additionally, such a system should automatically contact the authorities whenever the system detects an unattended child through the vehicle's satellite or similar communication system, such as the ONSTAR system marketed by General Motors, TELE AID marketed by the Mercedes division of Daimler Chrysler, etc., for vehicles equipped with such systems.

SUMMARY OF THE INVENTION

The system to detect the presence of an unattended child in a vehicle of the present invention addresses the aforementioned needs in the art by automatically detecting the presence of an unattended child and once so detected, activating an alarm in order to alert passersby to call authorities or to take action themselves. The system to detect the presence of an unattended child in a vehicle prevents the vehicle's doors being locked or remaining locked and uses the vehicle's satellite or similar communication system to contact authorities to the presence of an unattended child within the vehicle. The system to detect the presence of an unattended child in a vehicle has a disable feature in order to deactivate the system with the disable feature itself, being overridden upon the occurrence of certain events.

The system to detect the presence of an unattended child in a vehicle of the present invention is installed in a vehicle that has an ignition, a seat, a door having a lock including a driver's door, an alarm, and a seat belt buckle proximate the seat, with the system to detect the presence of an unattended child in a vehicle comprising an on/off switch, a temperature sensor installed within the vehicle, and a detector for detecting the presence of a mammal (child) within the vehicle. When the switch is on and the ignition has been shut off and the detector detects the presence of the mammal, the lock of the door is disabled and such that when the switch is off and the temperature sensor senses a temperature that exceeds a threshold limit, either above an upper limit or below a lower limit, and the detector detects the presence of the mammal, the alarm is activated. The lock of the door is disabled only if a driver of the vehicle has exited the vehicle. The driver of the vehicle has been deemed to have exited the vehicle whenever a door proximate a seat of the driver has been opened after the ignition has been shut off. The alarm of the vehicle is activated if the presence of the mammal continues to be detected after the expiration of a fixed amount of time after the driver has exited the vehicle when the switch is in the on position. A communication system of the vehicle is activated when the alarm is activated in order to alert authorities, if the vehicle is equipped with such a communication system. When the switch is on the weight pressure on the rear seat is measured and if the weight pressure is above a fixed threshold or if the seat belt buckle is buckled the detector detects the presence of the mammal otherwise the detector does not detect presence of the mammal and wherein when the switch is off the weight pressure on the rear seat is measured and if the weight pressure is above a fixed threshold or if motion is detected within the vehicle the detector detects the presence of the mammal otherwise the detector does not detect presence of the mammal (detection occurring only if the temperature threshold has been reached). When the switch is off and the alarm is activated the lock of the door is disabled. The alarm comprises a horn or siren or lights of the vehicle either on or flashing.

BRIEF DESCRIPTION OF THE DRAWINGS

Similar reference numerals refer to similar parts throughout the several views of the drawings.

DESCRIPTION OF THE PREFERRED EMBODIMENT

Figure 1:
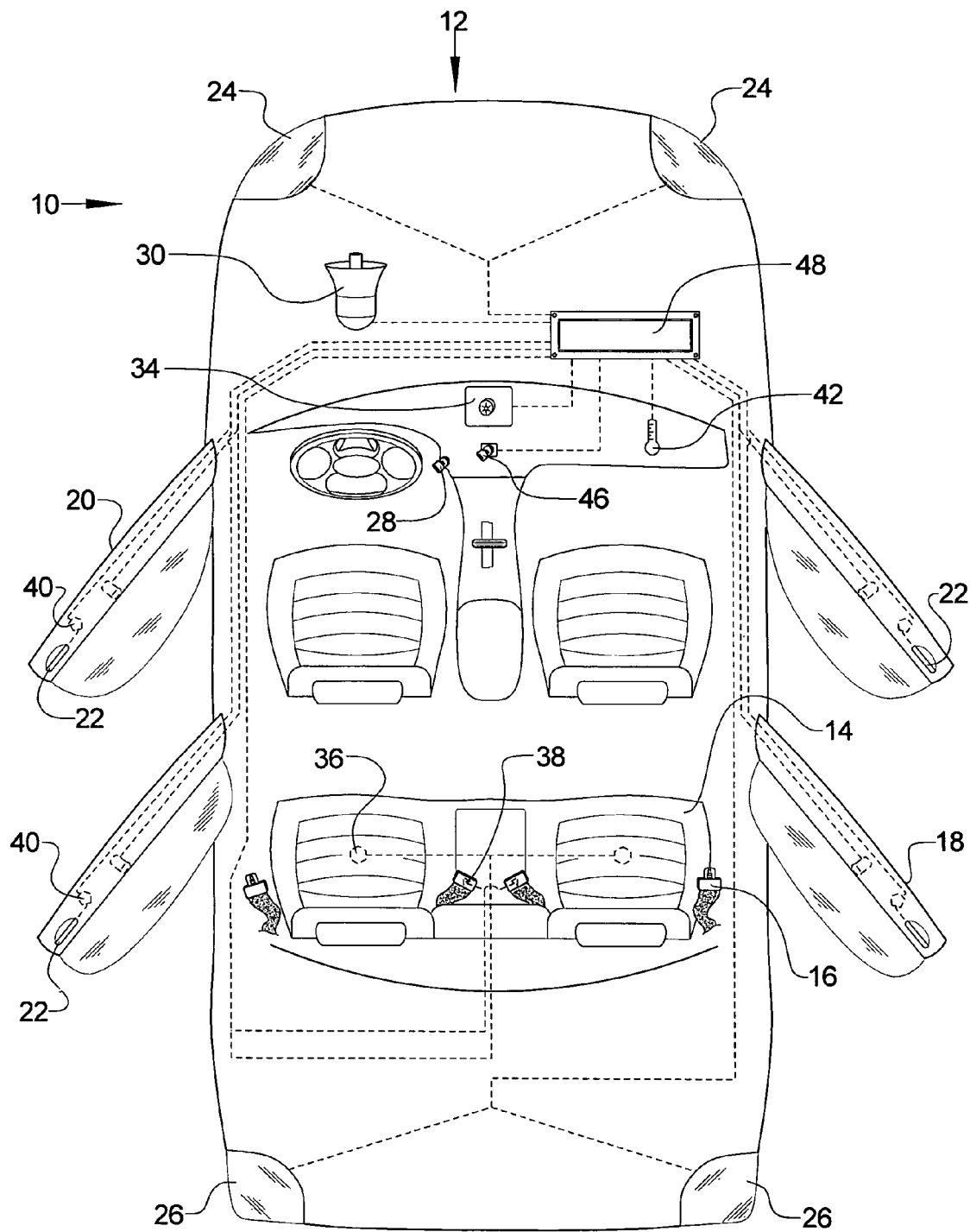
FIG. 1 is a schematic view of the system to detect the presence of an unattended child in a vehicle of the present invention.
Figure 2:
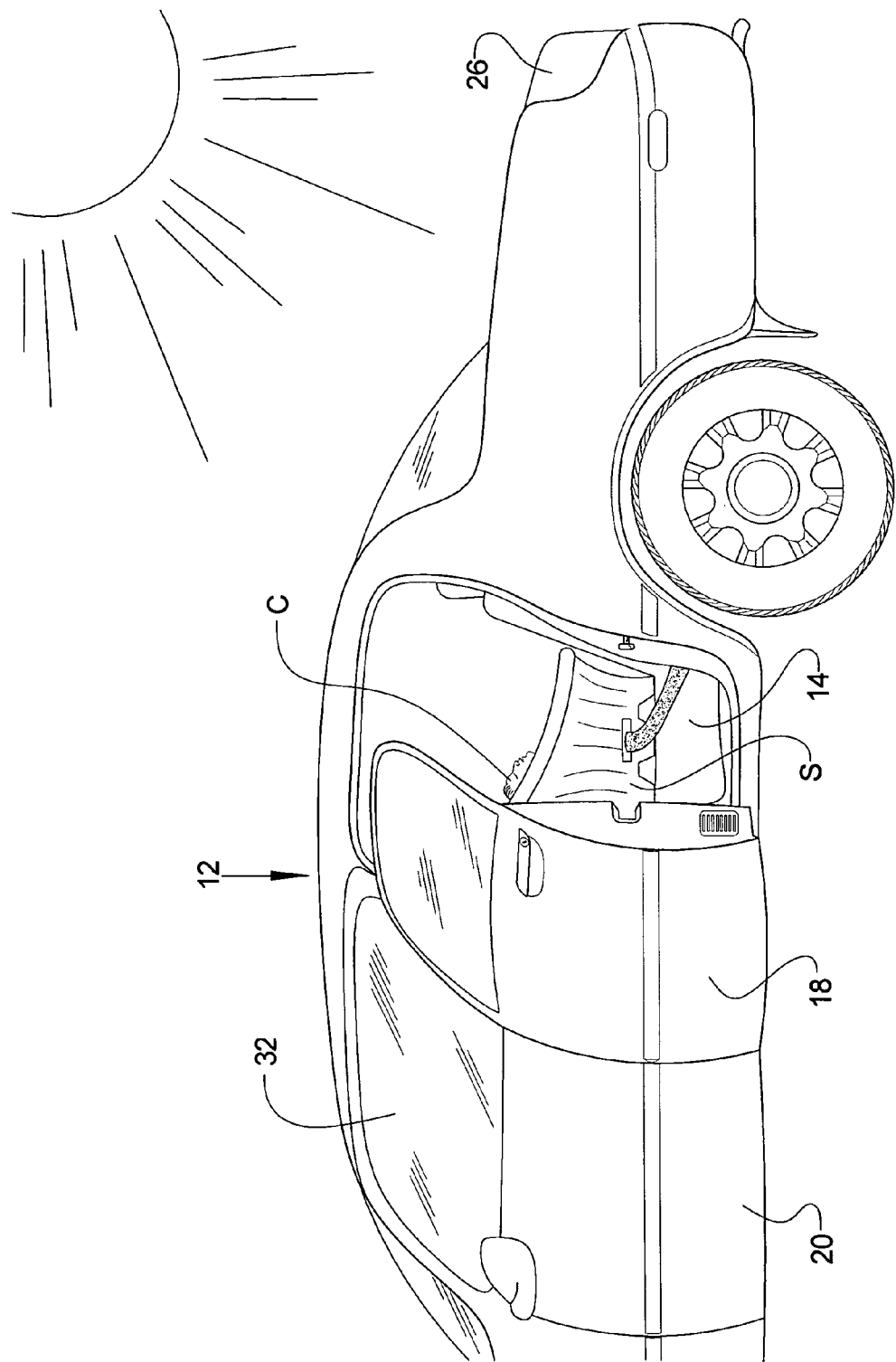
FIG. 2 is an elevation view of a child within a car seat in a vehicle equipped with the system to detect the presence of an unattended child in a vehicle of the present invention.

Referring now to the drawings, it is seen that the system to detect the presence of an unattended child in a vehicle of the present invention, generally denoted by reference numeral 10, is comprised of a standard vehicle 12 that has a seat 14, seat belt buckles 16 located proximate the seat 14, one or more rear doors 18, a driver's door 20, a door latch 22 on the driver's door 20 and each rear door 18, lights including headlights 24 and tail lights 26, an ignition switch 28, a horn or a siren 30, or both, and windows 32. The vehicle 12 may also be equipped with a communication system 34 such as the ONSTAR or TELE AID that can be used to summon aid by the driver or that automatically summons aid upon a certain vehicle crash event. Such systems use either satellite or cellular communication technology to communicate to a staffed communication center and many such systems give the GPS coordinates of the vehicle 12 to the operator at the communication center so that authorities can be directed to the vehicle 12 if the driver is incapacitated in any manner.

One or more pressure sensors 36 are located underneath the rear seats 14, the pressure sensors 36 detecting weight placed on the seats 14, the specific design of each pressure sensor 36 being of any conventional design known in the art. The pressure sensor 36 can be located underneath each seat 14, except possibly the driver's seat, or as most children C are transported in the rear seats of a vehicle 12 due to the powerful front seat airbags, especially smaller children C those that can least afford to be left unattended in a vehicle 12, the pressure sensor 36 can also be located underneath the front seat 14, although drivers are less apt to forget about a passenger sitting directly beside the driver. Each seat belt buckle 16 that is located proximate a seat 14 that has a pressure sensor 36 associated therewith has a seat belt buckle sensor 38 that detects whether the seat belt buckle 16 is buckled or unbuckled. The seat belt buckle sensor 38 is of any conventional design known in the art. The door latches 22 on the driver's door 20 and on the rear doors 18 each have a door latch sensor 40 that detects if the particular door 18 or 20 is open or closed. A temperature sensor 42 is located within the interior of the vehicle 12, the temperature sensor 42 detecting the temperature within the interior of the vehicle 12. The temperature sensor 42 is of any conventional design known in the art. One or more motion detectors 44 are located within the vehicle 12 for detecting motion within the vehicle 12. Advantageously, although not necessarily, the motion detectors 44 are infrared detectors that do not penetrate glass so that only motion within the vehicle's interior is detected and are otherwise of any conventional design known in the art. The motion detectors 44 should be able to detect motion within the seats 14 as well as on the floor boards of the vehicle 12 for children C that have fallen or climbed off of the seats 14. The system to detect the presence of an unattended child in a vehicle 10 has an on/off system switch 46 for enabling and disabling the system 10. The system switch 46 may be a simple throw switch, although, advantageously, will be a keyed switch in order to make the switching of the system 10 off a very deliberate act. A controller 48 controls operation of the system 10 and interfaces with other components of the vehicle 12.

Figure 3:
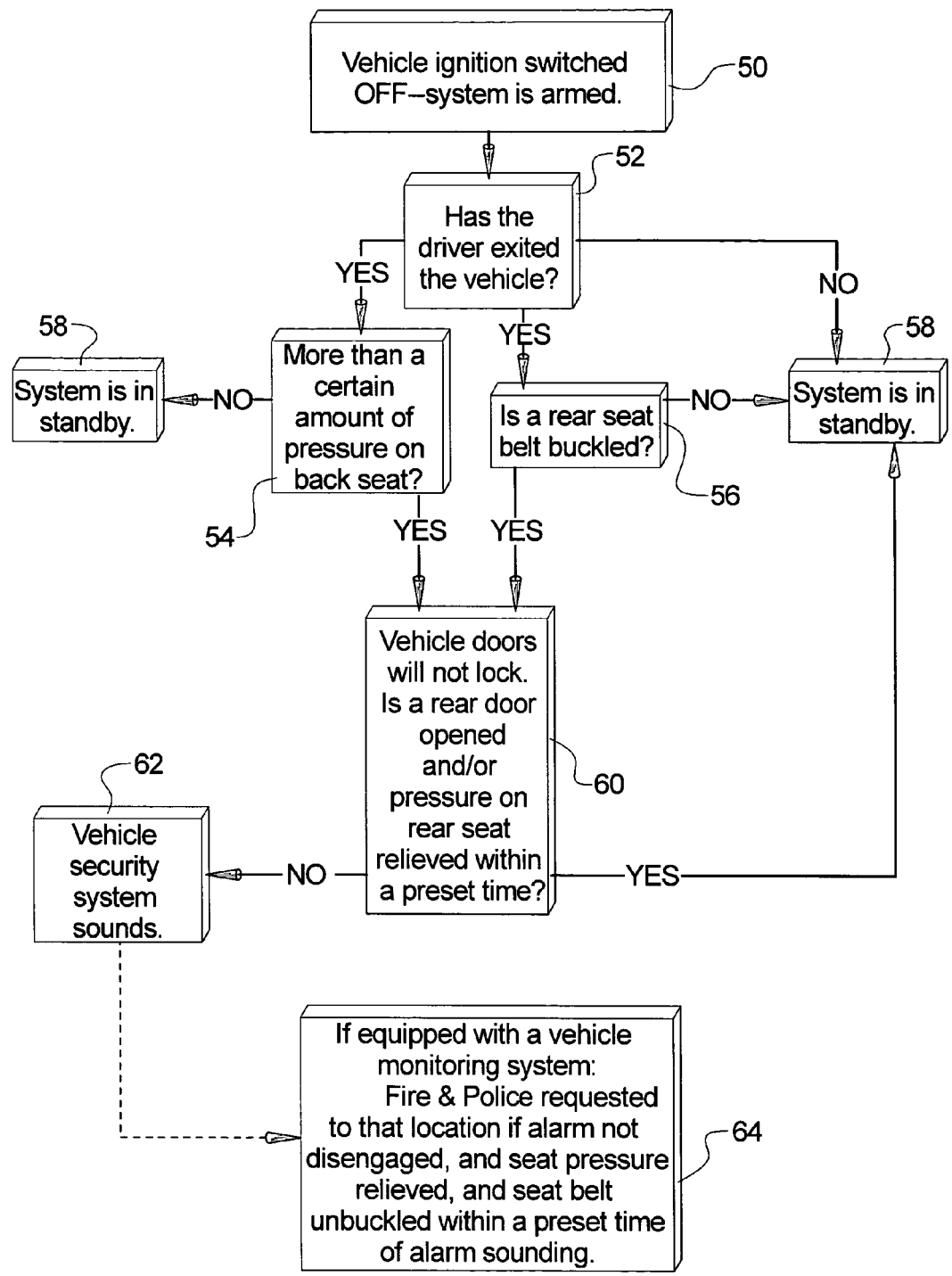
FIG. 3 is a flow chart of the system to detect the presence of an unattended child in a vehicle in operational mode.

In operation, the switch 46 is placed in the on position as illustrated by the flow chart of FIG. 3 and the system 10 is armed when the ignition switch 28 is turned to the off position 50. The system 10 first determines whether the vehicle 12 has been exited by the driver 52. This is accomplished by polling the door latch sensor 40 on the driver's door 20 to see if the driver's door 20 has been opened after ignition off indicating the driver has exited the vehicle 12 or by detecting whether the key has been completely removed from the ignition. Alternately, and not illustrated, a pressure sensor 36 can be placed underneath the driver's seat and this particular sensor 36 is polled and if this sensor 36 fails to detects weight above a threshold amount, the driver is deemed to have exited the vehicle 12. If the driver has been deemed to have exited the vehicle 12, then the system detects whether a child (or other mammal such as the family dog) is present within the vehicle 12. This is accomplished in one of two ways. If any of the pressure sensors 36 detect a weight above a certain threshold 54, the system 10 detects the presence of a child C within the vehicle 12. The threshold weight is set sufficiently high so that a small load such as a newspaper or a small grocery bag do not rise above the threshold limit thereby detecting a child C. Alternately, the system 10 checks the seat belt buckle sensors 38 to determine if any of the buckles 16 are buckled 56. If any seat belt buckles 16 are buckled, then a child C is detected. The use of the two alternatives acts as a fail-safe in that the pressure sensors 36 may fail to detect a very small child C that together with the child seat S fail to go above the weight threshold limit, then the fact that the child seat S is buckled in, the seat belt buckle sensors 38 will detect the presence of a child C. Similarly, some children C unbuckle themselves or some parents simply do not buckle the children C in. In such a circumstance, the pressure sensor 36 detects the presence of a child. If the presence of a child C is not detected, then the system goes into standby mode 58. If the presence of a child C is detected, the system 10 disables the locks on the doors 18 and 20 of the vehicle 12, meaning that the doors 18 and 20 cannot lock and if the doors 18 and 20 are already locked, they are unlocked and the system 10 monitors whether a rear door 18 of the vehicle has been opened 60, indicating a parent retrieving the child C from the back seat 14 of the vehicle 12, by polling the door latch sensors 40 associated with the rear doors 18 or whether pressure has been relieved from one of the seats 14 as measured by the pressure sensor 36, indicating a parent lifting the child C out of the seat, either the vehicle's seat 14 or a strapped in child seat S. If the rear door 18 has been opened or the pressure has been lifted from the seats 14, then the system determines that the child C has been removed by the parent and the system goes into standby mode. If the rear door has nor been opened or the pressure from the seat 14 has not been relieved after a present amount of time, the alarm of the vehicle 12 is activated 62. The alarm that is activated can be the horn 30 of the vehicle and/or the siren of the vehicle's security system if the vehicle 12 is so equipped and/or the lights 24 and/or 26 of the vehicle either coming on or even better flashing either in straightforward or wig wag fashion. If after the alarm system is activated and the alarm is not disengaged and pressure is not relieved from the seat 14 and the seat belt buckles 16 are not unbuckled within a preset amount of time, the communication system 34 of the vehicle 12, if so equipped, is activated 64 by summoning authorities including giving the authorities the GPS location coordinates of the vehicle 12.

Figure 4:
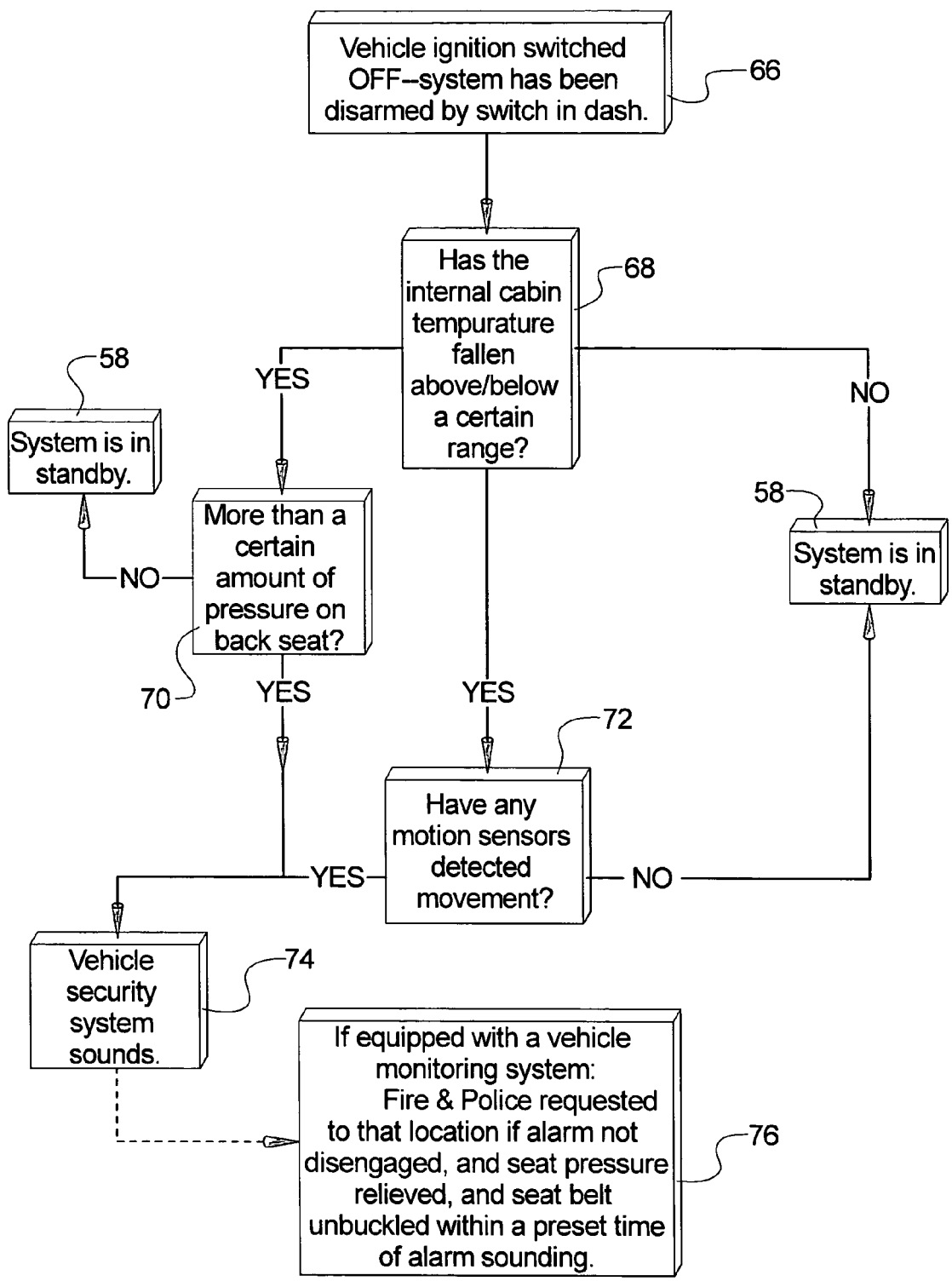
FIG. 4 is a flow chart of the system to detect the presence of an unattended child in a vehicle in disable mode.

If the system switch 46 is placed in the off position 66 as illustrated by the flow chart of FIG. 4, which can be the case for a parent that has a child seat S buckled in the vehicle 12, indicating the presence of a child C even if the child C is not actually present, yet is not transporting the child C on a particular trip, the system 10 monitors the temperature within the vehicle's interior 68 via the temperature sensor 42. If the temperature rises above a certain threshold or falls below a certain threshold, each indicating a dangerous condition, for an unattended child C, the system 10 attempts to detect the presence of a child C either by monitoring whether the pressure sensors 36 detect a weight above the threshold weight 70 or whether the motion sensor 44 detects motion within the vehicle's interior 72. The seat belt buckle sensors 38 are not used to detect for the presence of the child C when the system switch 46 is in the off position, due to the fact that the system switch 46 may have been placed in the off position due to the fact that a seat belt buckle 16 was buckled due to a car seat S being installed, yet the child C was not within the seat on the particular trip. If the presence of a child C is not detected the system goes into standby mode 58, otherwise the alarm is activated 74 in the manner described above. Additionally, the door locks may be disabled in the manner described above. If after the alarm system is activated and the alarm is not disengaged and pressure is not relieved from the seat 14 and the seat belt buckles 16 are not unbuckled within a preset amount of time (indicating the child not being rescued), the communication system 34 of the vehicle 12, if so equipped, is activated 76 by summoning authorities including giving the authorities the GPS location coordinates of the vehicle 12.

Whenever the system 10 is in standby mode, the system 10 resets upon the next startup of the ignition switch 28. The controller 48 controls all aspects of the system 10 including monitoring each sensor as needed, interacting with the various subsystems of the vehicle 12 (security system, lights, if flashed or otherwise illuminated, horn, if sounded, communication system 34 if present and if activated, etc.).

While the invention has been particularly shown and described with reference to an embodiment thereof, it will be appreciated by those skilled in the art that various changes in form and detail may be made without departing from the spirit and scope of the invention.

I claim:

1. A detection system for detecting an unattended mammal within a vehicle, the vehicle having an ignition switch, a seat, a door having a lock, an alarm, and a seat belt buckle proximate the seat, the detection system comprising:
   a system switch;
   a temperature sensor installed within the vehicle
   a detector for detecting the presence of a mammal within the vehicle; and
   such that when the system switch is on and the ignition switch has been shut off and the detector detects the presence of the mammal, the lock of the door is disabled and such that when the system switch is off and temperature senses a temperature that exceeds a threshold limit and the detector detects the presence of the mammal, the alarm is activated.

2. The detection system as in claim 1 wherein the lock of the door is disabled only if a driver of the vehicle has exited the vehicle.

3. The detection system as in claim 2 wherein the driver of the vehicle has exited the vehicle whenever a door proximate a seat of the driver has been opened after the ignition has been shut off.

4. The detection system as in claim 2 wherein the alarm of the vehicle is activated if the presence of the mammal continues to be detected after the expiration of a fixed amount of time after the driver has exited the vehicle when the system switch is in the on position.

5. The detection system as in claim 4 wherein a communication system of the vehicle is activated when the alarm is activated in order to alert authorities.

6. The detection system as in claim 1 wherein the weight pressure on the rear seat is measured and if the weight pressure is above a fixed threshold the presence of the mammal is detected otherwise, the detector does not detect the presence of the mammal.

7. The detection system as in claim 1 wherein if seat belt buckle is buckled the detector detects the presence of the mammal and if the seat belt buckle is unbuckled, the detector does not detect the presence of the mammal.

8. The detection system as in claim 1 wherein if motion is detected within the vehicle the detector detects the presence of the mammal and if motion is not detected within the vehicle, the detector does not detect the presence of the mammal.

9. The detection system as in claim 1 wherein when the system switch is on the weight pressure on the rear seat is measured and if the weight pressure is above a fixed threshold or if seat belt buckle is buckled the detector detects the presence of the mammal otherwise the detector does not detect presence of the mammal and wherein when the system switch is off the weight pressure on the rear seat is measured and if the weight pressure is above a fixed threshold or if motion is detected within the vehicle the detector detects the presence of the mammal otherwise the detector does not detect presence of the mammal.

10. The detection system as in claim 1 wherein when the system switch is off and the alarm is activated the lock of the door is disabled.

11. The detection system as in claim 1 wherein the alarm comprises a horn or siren.

12. The detection system as in claim 1 wherein the alarm system comprises lights of the vehicle flashing.

13. The detection system as in claim 1 wherein the alarm comprises a horn or siren or lights of the vehicle flashing.

* * * * *